(12) United States Patent
Chi et al.

(10) Patent No.: US 11,153,427 B2
(45) Date of Patent: Oct. 19, 2021

(54) MOBILE TERMINAL AND METHOD FOR CONTROLLING THE SAME

(71) Applicant: LG ELECTRONICS INC., Seoul (KR)

(72) Inventors: Jumin Chi, Seoul (KR); Jina Kim, Seoul (KR); Jinyung Park, Seoul (KR); Seongmin Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/761,796

(22) PCT Filed: Sep. 5, 2018

(86) PCT No.: PCT/KR2018/010348
§ 371 (c)(1),
(2) Date: May 5, 2020

(87) PCT Pub. No.: WO2020/050432
PCT Pub. Date: Mar. 12, 2020

(65) Prior Publication Data
US 2020/0267250 A1 Aug. 20, 2020

(51) Int. Cl.
*H04M 1/724* (2021.01)
*H04B 1/38* (2015.01)
(Continued)

(52) U.S. Cl.
CPC ...... *H04M 1/72409* (2021.01); *G06F 3/0482* (2013.01); *H04M 1/72466* (2021.01); *H04N 5/232935* (2018.08)

(58) Field of Classification Search
CPC ............ H04M 1/724; H04M 1/72409; H04M 1/72412; H04M 1/72415; H04M 1/72466;
(Continued)

(56) References Cited

U.S. PATENT DOCUMENTS 9,269,327 B2 * 2/2016 Iwata ................. H04N 21/4436
9,710,161 B2 * 7/2017 Ryu ..................... G06F 3/04847
(Continued)

FOREIGN PATENT DOCUMENTS

CN 106200897 12/2016
CN 106470275 3/2017
(Continued)

OTHER PUBLICATIONS

PCT International Application No. PCT/KR2018/010348, Notification of Transmittal of the International Search Report and the Written Opinion of the International Searching Authority, or Declaration dated Jun. 5, 2019, 11 pages.
(Continued)

*Primary Examiner* — Quochien B Vuong
(74) *Attorney, Agent, or Firm* — Lee, Hong, Degerman, Kang & Waimey

(57) ABSTRACT

A mobile terminal is disclosed to solve a problem of a control method of the related art for controlling an external device, which is not intuitive and inconvenient. The mobile terminal comprises a camera configured to receive a preview image including at least one external device; a display unit configured to display the preview image; and a controller operably coupled with the camera and the display unit, and configured to control the display unit to display a control menu for the external device included in the preview image, and generate a control signal corresponding to a user input signal for the control menu in response to the user input signal.

16 Claims, 11 Drawing Sheets

(51) Int. Cl.
*H04M 1/72409* (2021.01)
*H04N 5/232* (2006.01)
*G06F 3/0482* (2013.01)
*H04M 1/72466* (2021.01)

(58) Field of Classification Search
CPC .......... H04M 1/72469; H04M 2201/38; G06F 3/011; G06F 3/016; G06F 3/017; G06F 3/0488; G06F 3/04842; G06F 3/0482; G06F 3/04847; G06F 3/0484; G06F 3/04886; G06F 3/147; H04N 5/23296; H04N 5/23293; H04N 5/232939; H04W 4/80; H04W 12/08; H04W 12/50; H04W 88/02; H04B 1/3833
See application file for complete search history.

(56) References Cited

U.S. PATENT DOCUMENTS

| | | | | |
|---|---|---|---|---|
| 9,983,722 | B2* | 5/2018 | Yi | ............................ G06F 1/165 |
| 10,567,567 | B2* | 2/2020 | Seo | ........................ G06F 1/1626 |
| 10,739,907 | B2* | 8/2020 | Han | ........................ G06F 9/3004 |
| 2016/0014577 | A1 | 1/2016 | Mannan et al. | |
| 2017/0134553 | A1 | 5/2017 | Jeon et al. | |
| 2017/0185276 | A1 | 6/2017 | Lee et al. | |
| 2020/0169427 | A1* | 5/2020 | Wu | ...................... H04L 12/2814 |

FOREIGN PATENT DOCUMENTS

| | | | |
|---|---|---|---|
| CN | 107040646 | 8/2017 | |
| KR | 1020050092521 | 9/2005 | |
| KR | 1020050092521 A * | 9/2005 | ............ H04M 1/725 |
| KR | 1020120016752 | 2/2012 | |
| KR | 101593916 | 2/2016 | |
| KR | 1020160027791 | 3/2016 | |
| KR | 1020160027791 A * | 3/2016 | ............... G06F 3/00 |
| KR | 1020170021159 | 2/2017 | |
| WO | 2013154476 | 10/2013 | |

OTHER PUBLICATIONS

The State Intellectual Property Office of the People's Republic of China Application Serial No. 201880074091.X, Office Action dated Nov. 27, 2020, 8 pages.
European Patent Office Application Serial No. 18932896.6, Search Report dated May 20, 2021, 7 pages.

* cited by examiner

FIG. 8
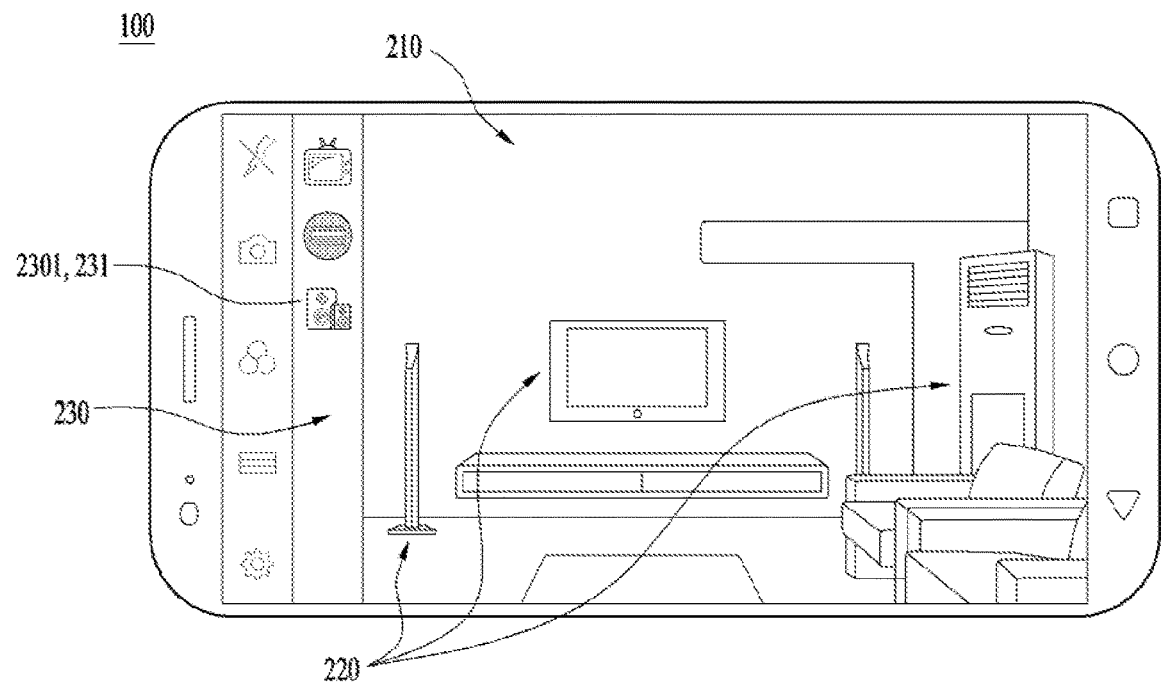
(a)
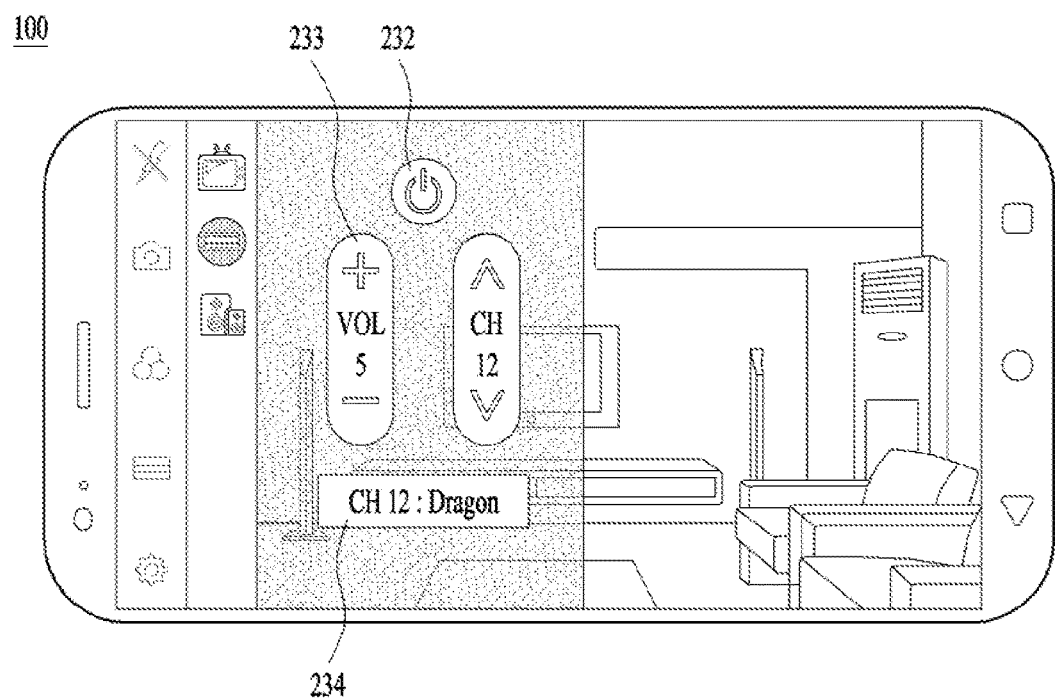
(b)

FIG. 9
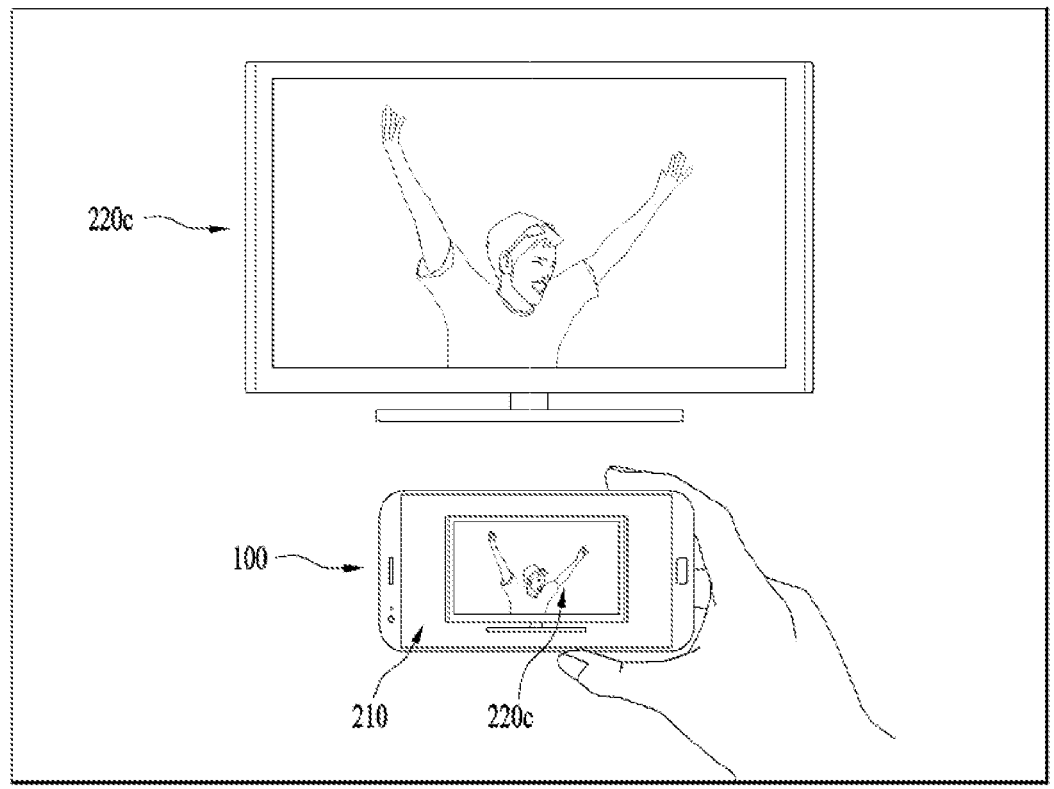
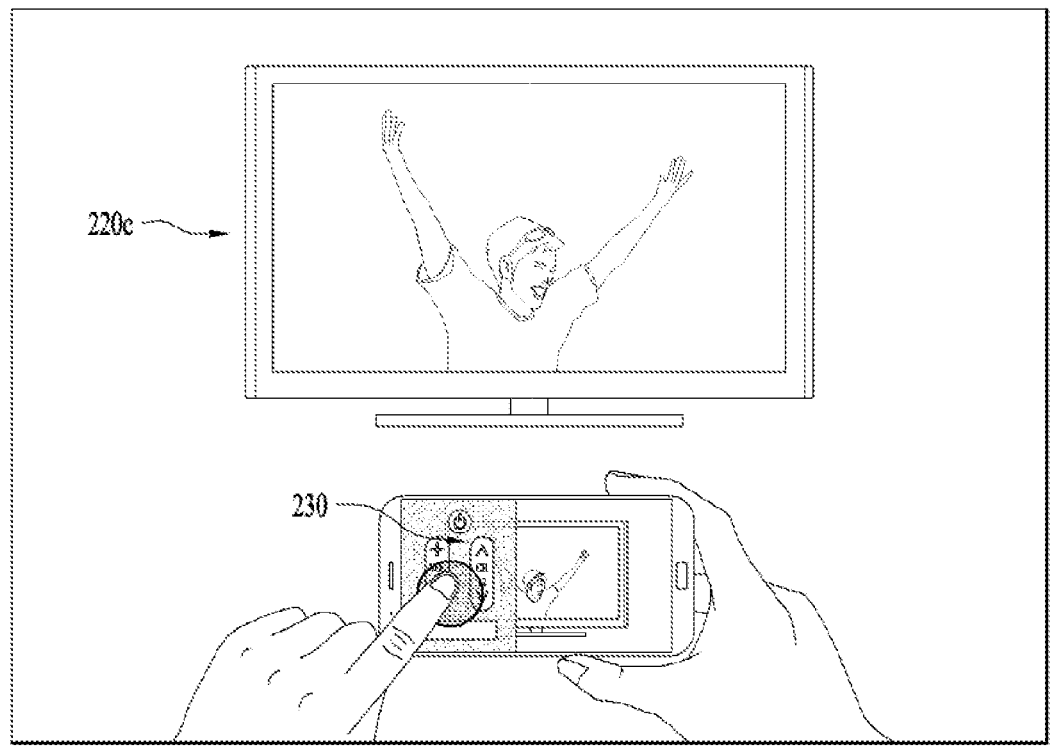

FIG. 10
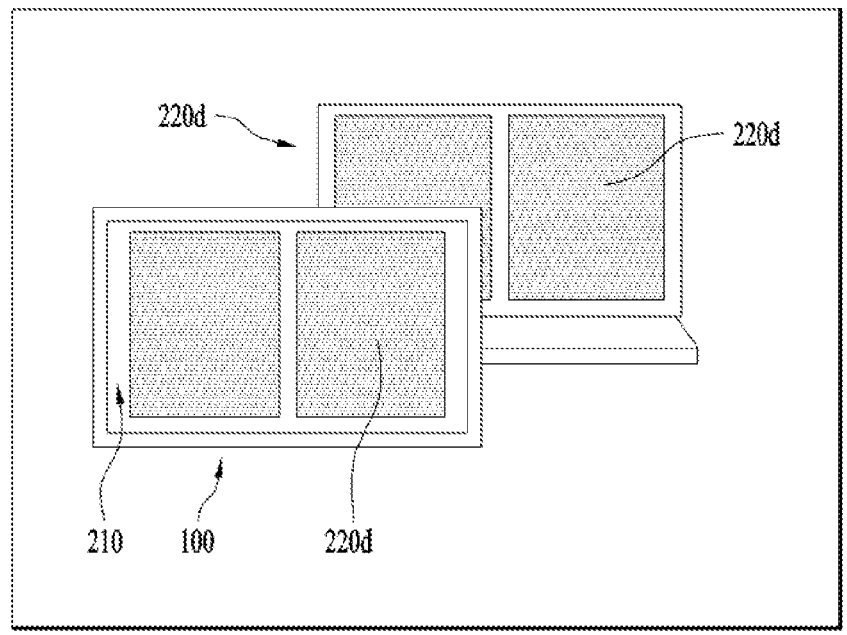
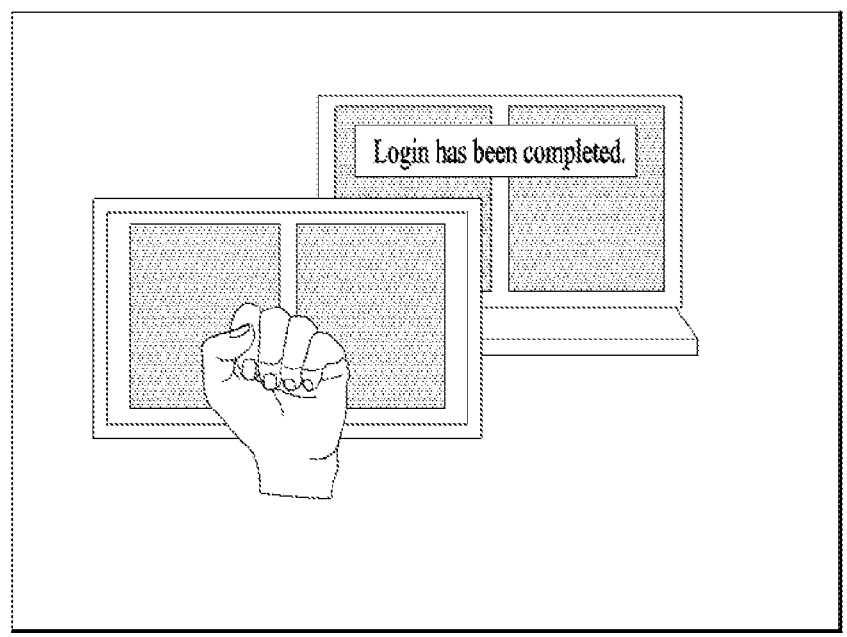

MOBILE TERMINAL AND METHOD FOR CONTROLLING THE SAME

CROSS-REFERENCE TO RELATED APPLICATIONS

This application is the National Stage filing under 35 U.S.C. 371 of International Application No. PCT/KR2018/010348, filed on Sep. 5, 2018, the contents of which are all hereby incorporated by reference herein in its entirety.

TECHNICAL FIELD

The present disclosure relates to a mobile terminal that controls an external device.

BACKGROUND ART

IoT technologies that provide integrated control for an external device registered with a network equipment or a mobile terminal such as smartphone have been required.

For example, the mobile terminal may power on/off an air conditioner, a washing machine, etc. or control an operation of the air conditioner, the washing machine, etc.

However, problems occur in that the mobile terminal should perform a separate application to control the external device and is not intuitive.

DISCLOSURE

Technical Problem

An object of the present disclosure is to provide a mobile terminal devised to solve a problem of a control method of the related art for controlling an external device, which is not intuitive and inconvenient.

Technical Solution

To achieve the above or other objects, according to one aspect of the present disclosure, there is provided a mobile terminal comprising a camera configured to receive a preview image including at least one external device; a display unit configured to display the preview image; and a controller operably coupled with the camera and the display unit, and configured to control the display unit to display a control menu for the external device included in the preview image, and generate a control signal corresponding to a user input signal for the control menu in response to the user input signal.

Advantageous Effects

Advantageous effects of a mobile terminal according to the present disclosure are as follows.

According to at least one of the embodiments of the present disclosure, it is advantageous that a menu capable of controlling an external device by performing a camera application is provided.

Also, according to at least one of the embodiments of the present disclosure, it is advantageous that an external device may be controlled on an always-on display without performing a separate application.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

FIG. 8 illustrates another embodiment of a mobile terminal according to the present disclosure.

FIG. 9 illustrates one embodiment of a mobile terminal according to the present disclosure.

FIG. 10 illustrates one embodiment of a mobile terminal according to the present disclosure.

MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
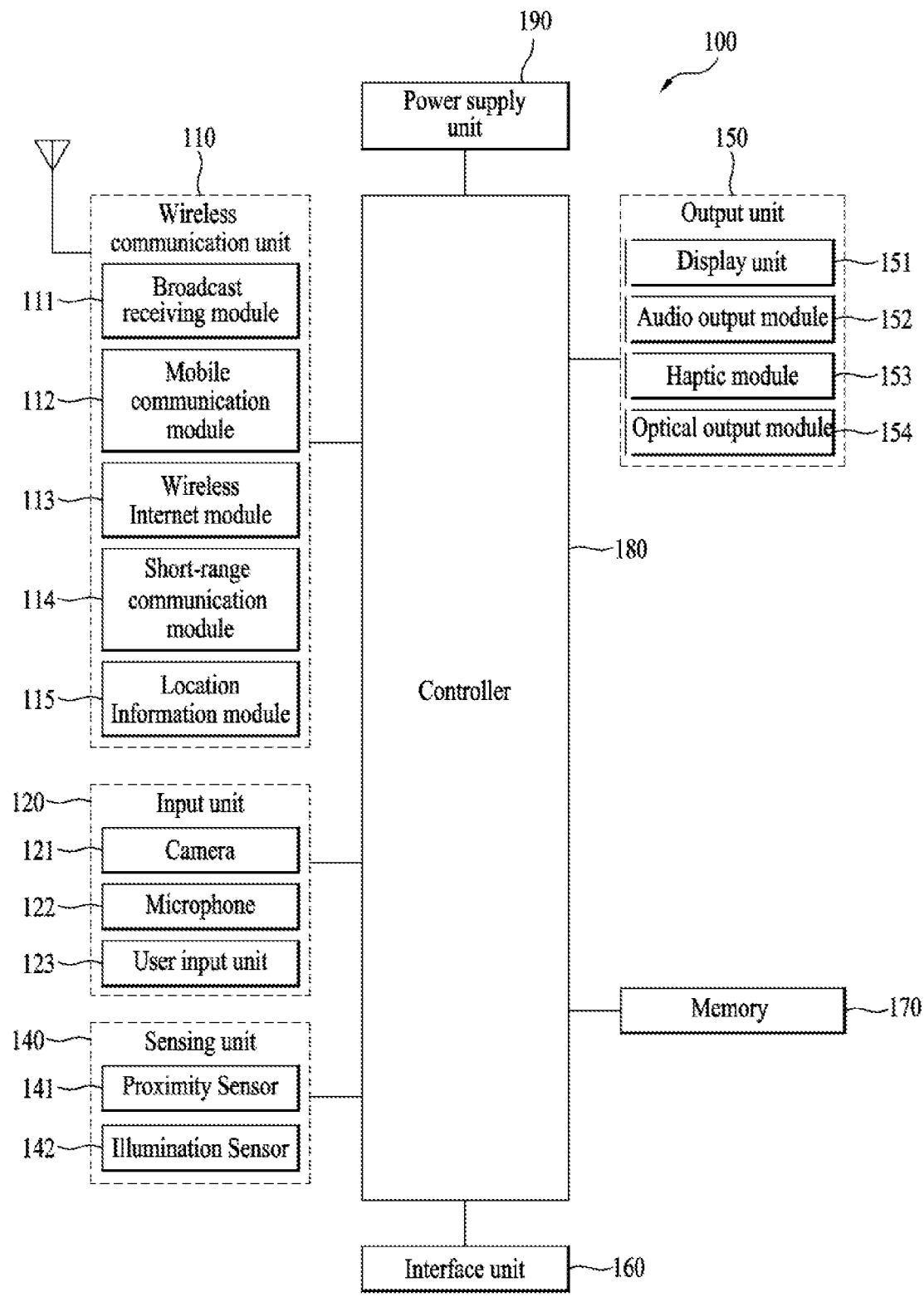
FIG. 1 is a block diagram to describe a mobile terminal related to the present invention.

FIG. 1 is a block diagram to describe a mobile terminal related to the present invention.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

For instance, the wireless communication unit 110 typically includes one or more components which permit wireless communication between the mobile terminal 100 and a wireless communication system or network within which the mobile terminal is located.

The wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, and the like) for allowing a user to input information. Data (for example, audio, image, and the like) is obtained by the input unit 120 and may be analyzed and processed by controller 180 according to user commands thereof.

The sensing unit 140 is typically implemented using one or more sensors configured to sense internal information of the mobile terminal, the surrounding environment of the mobile terminal, user information, and the like. For example, in FIG. 1, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170.

Moreover, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components can cooperatively operate to implement operations, controls and controlling methods of the mobile terminal according to various embodiments described in the following. The operations, controls or controlling methods of the mobile terminal can be implemented on the mobile terminal by running at least one application program saved to the memory 170.

Referring still to FIG. 1, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi) and Wi-Fi Direct, and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114.

Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal 100 covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
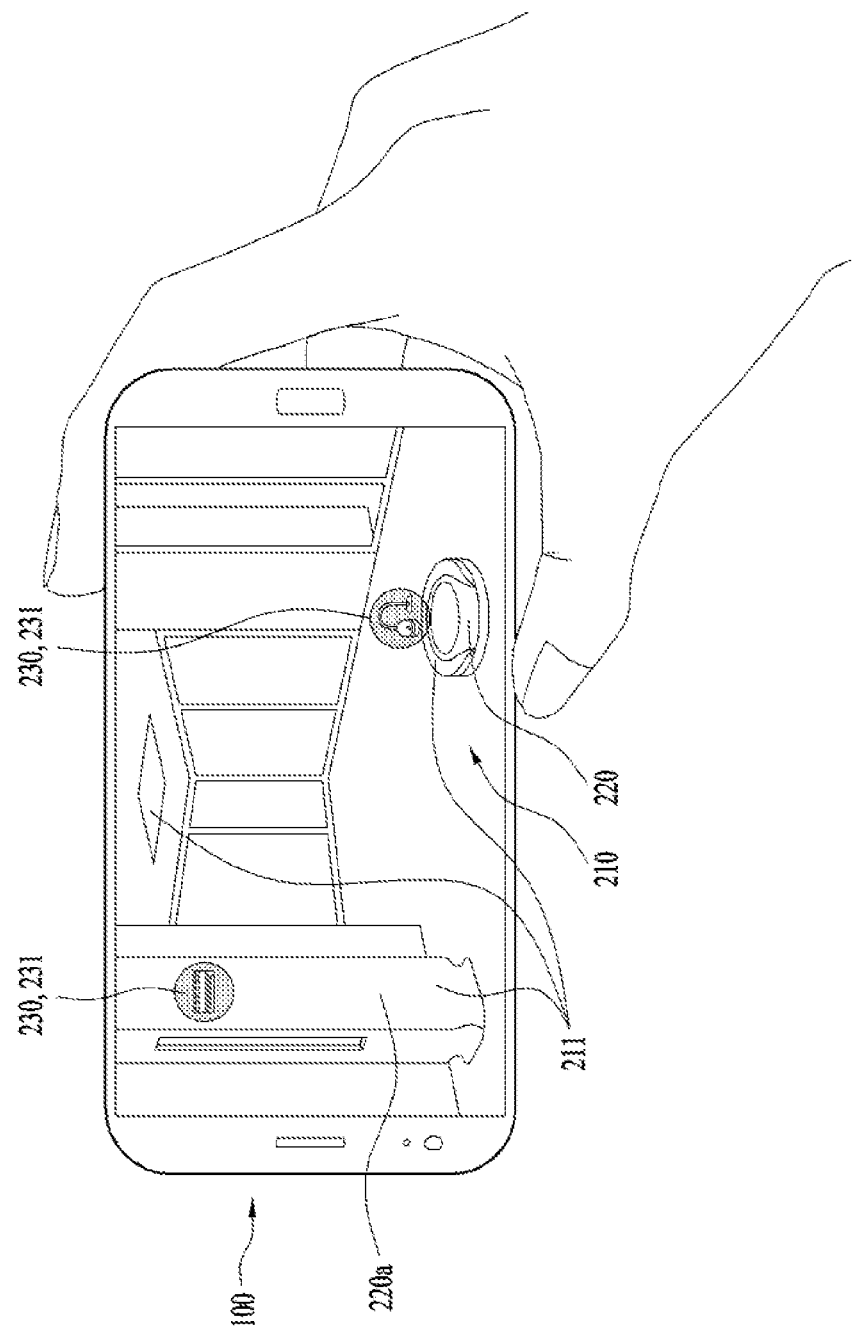
FIG. 2 illustrates one embodiment of a mobile terminal according to the present disclosure.

FIG. 2 illustrates one embodiment of a mobile terminal 100 according to the present disclosure.

When a camera application is executed, a display unit may output a preview image 210 of a subject captured by a camera. The preview image 210 means an image of a subject within a viewing angle currently oriented by the camera.

The preview image 210 may include at least one object 211. The objects 211 mean targets that may be defined on a specific basis, and may be various shapes such as human, animal, and thing.

The objects 211 may be analyzed to specify a type of a corresponding target and display related information, or a capturing set value of the camera may be changed by the mobile terminal 100 in accordance with attributes of the target. An AI camera function may be one of methods for performing the above function. The AI camera function may be powered on/off by selection of a user when the preview image 210 is output.

The AI camera function may use an image analysis algorithm. For example, the preview image 210 which is acquired is recognized on a pixel basis and divided on an object basis, and a boundary of all or some of the objects 211 is recognized to analyze a corresponding target based on big data. However, this is exemplary, and the corresponding target may be determined through another method.

An external device 220 means one of the analyzed objects 211, which is connected with the mobile terminal 100 and may be controlled by the mobile terminal 100.

A controller 180 (see FIG. 1) may recognize the external device 220 included in the preview image 211.

Whether the external device 220 is in the preview image 210 or what the external device 220 is may be analyzed by a method such as the aforementioned AI camera function, or may be analyzed a position of the external device 220 registered in the mobile terminal 100 and a position and direction of the mobile terminal 100 when the external device 220 is previously registered in the mobile terminal 100. Unlike this method, a method for recognizing intensity of a unique radio signal owned by the external device 220 may be used.

The controller 180 (see FIG. 1) may output a control menu 230 corresponding to the external device 220 after recognizing whether the external device 220 is in the preview image 210 or what the external device 220 is.

For example, if an air conditioner 220a is recognized as the external device 220 in the preview image 210, the controller 180 (see FIG. 1) may allow the display unit 151 to output a control menu 230 corresponding to the air conditioner 220a.

The control menu 230 may be an entrance menu 231, an on/off menu 232 or a detailed operation menu 233 of the corresponding external device 220. FIG. 2 illustrates the entrance menu 231 of the air conditioner 220a, wherein the entrance menu 231 may be an indicator indicating a type of the external device 220. The indicator may be a form of an icon identified from the external device 220, or may be expressed as a boundary line of the external device 220. As the case may be, the entrance menu 231 may serve as an indicator recognizing the external device 220 and displaying a type of the external device 220 and at the same time serve as an on/off menu 232.

Figure 3:
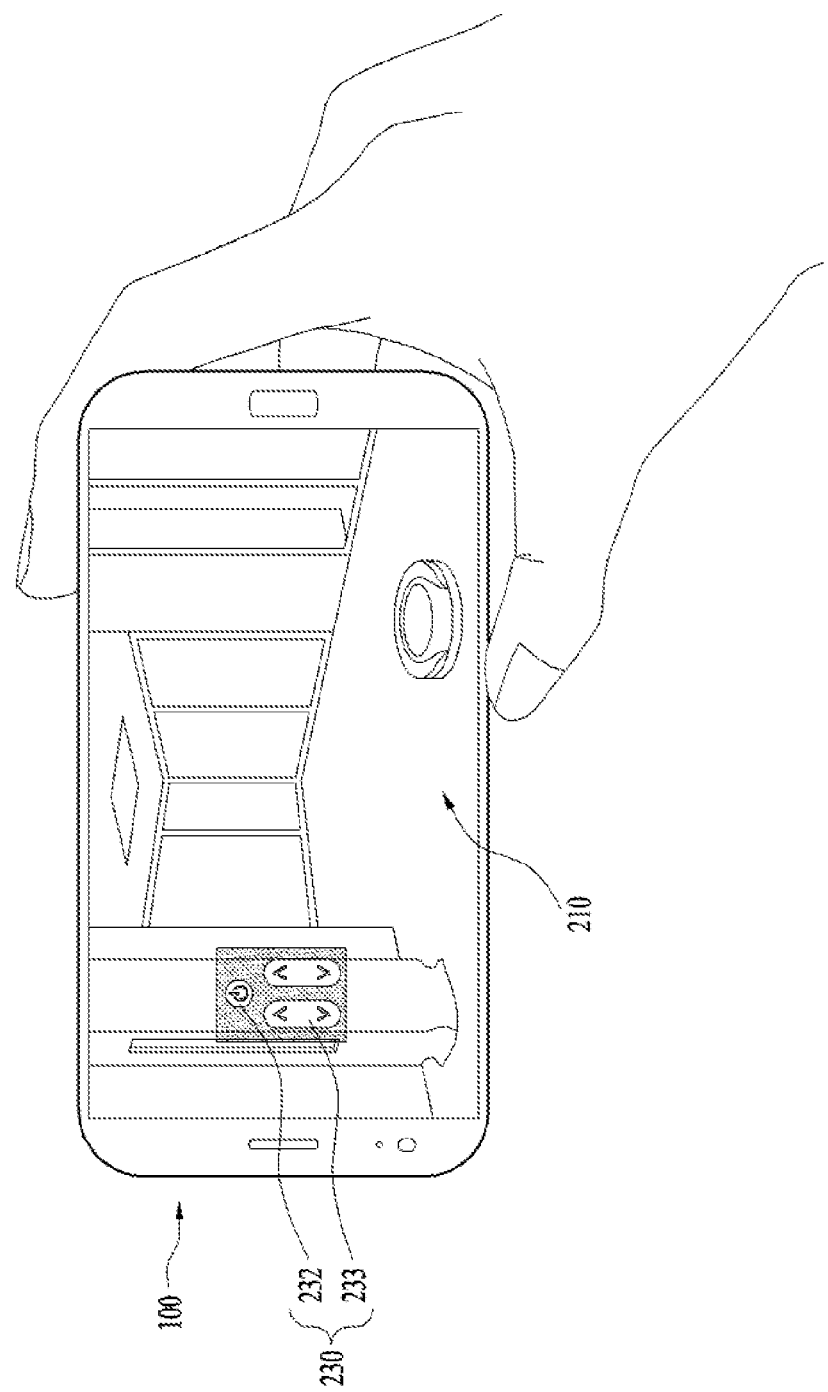
FIG. 3 illustrates one embodiment of a mobile terminal according to the present disclosure.

FIG. 3 illustrates one embodiment of a mobile terminal 100 according to the present disclosure.

The control menu 230 may include an on/off menu 232 and detailed operation menus 233. For example, if the external device 220 is the air conditioner 220a, the control menu 230 may be detailed operation menus 233, that is, a temperature control menu and a wind volume control menu.

Figure 4:
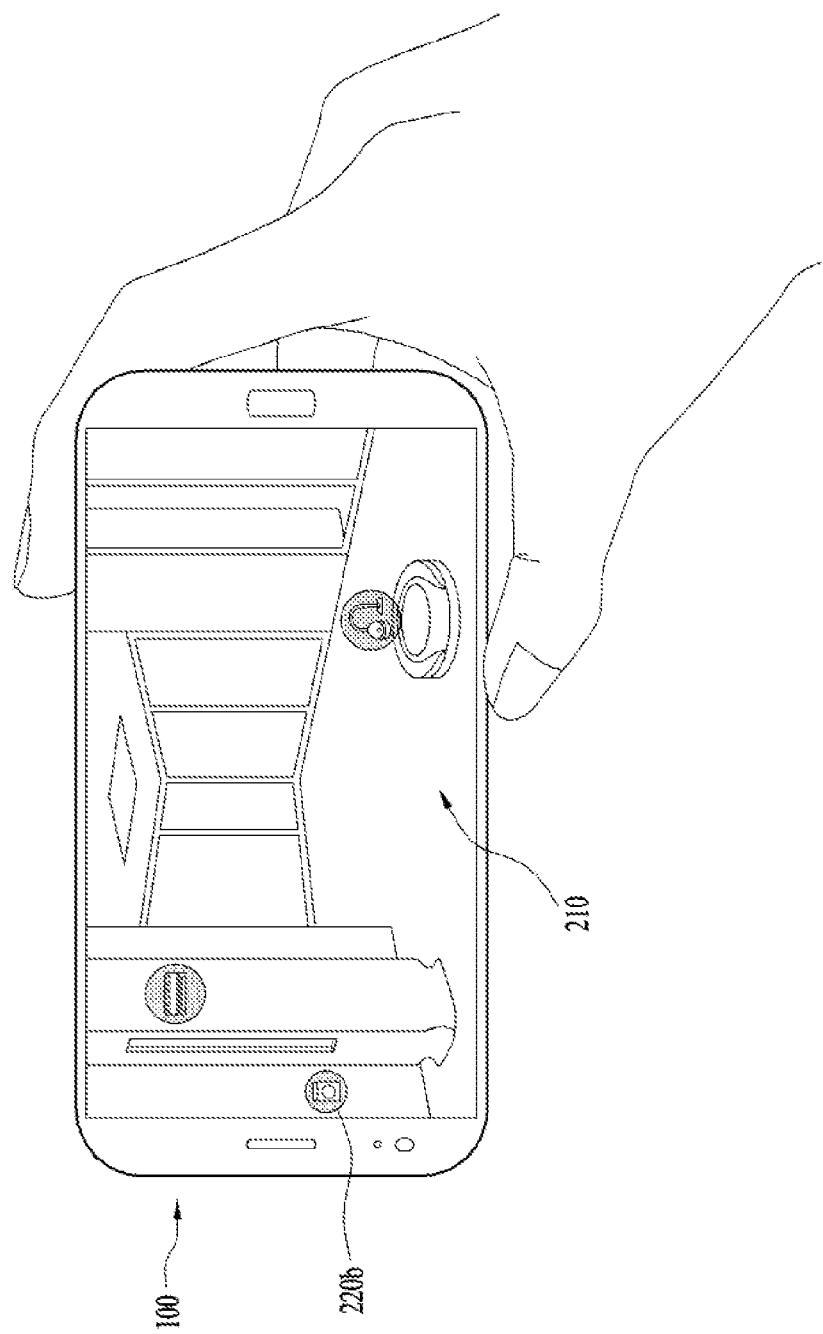
FIG. 4 illustrates one embodiment of a mobile terminal according to the present disclosure.

FIG. 4 illustrates one embodiment of a mobile terminal 100 according to the present disclosure.

The external device 220 from which the control menu 230 is output should be seen in the preview image 210 as a rule. However, as the case may be, an external device 220b covered by another image may be recognized, and the control menu 230 may be output. For example, although the object 211 is still located within a viewing angle of the camera but is covered by another image in accordance with position movement or rotation of the mobile terminal 100, the control menu 230 may be output such that a user may control the corresponding external device 220b. This is to allow the user not to be disturbed by an unintended status even though the user intends to control the corresponding external device 220b.

Figure 5:
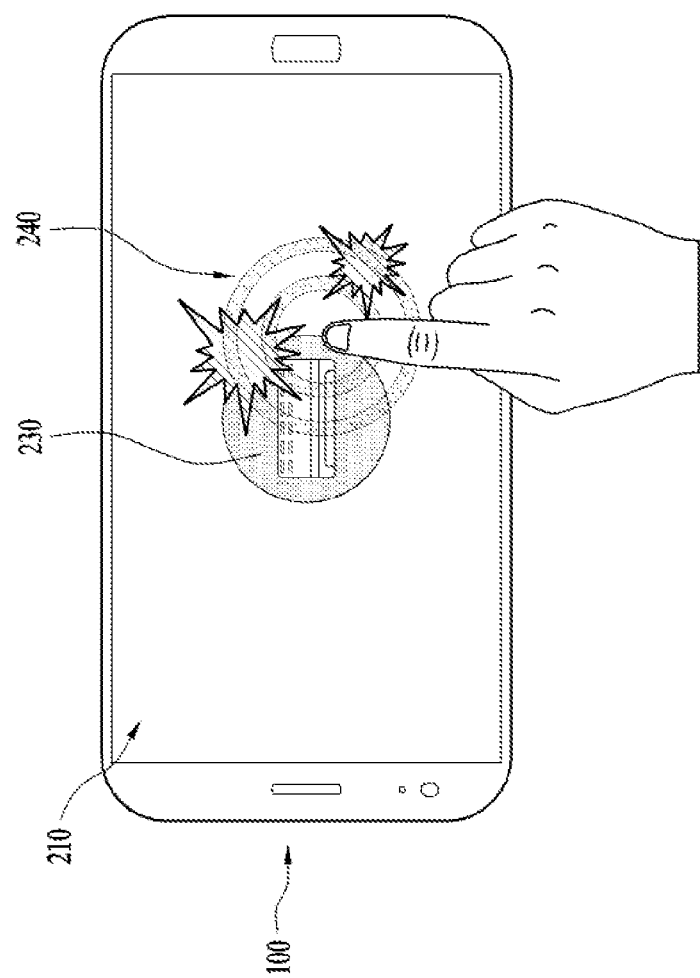
FIG. 5 illustrates one embodiment of a mobile terminal according to the present disclosure.

FIG. 5 illustrates one embodiment of a mobile terminal 100 according to the present disclosure.

If a user input signal 240 for the control menu 230 is sensed, a control signal corresponding to the user input signal may be generated.

The user input signal 240 may be input in various ways. For example, if the display unit is a touch screen, a user input of the user input signal 240 may include a double-tap input. If a double-tap is input to the control menu 230, an on/off function for the operation of the external device 220 may be performed. The double-tap input is identified from a single-tap input, and has an advantage for performing a function identified from that of a single-tap in that the single-tap in a camera application generally performs focusing of a corresponding point.

Figure 6:
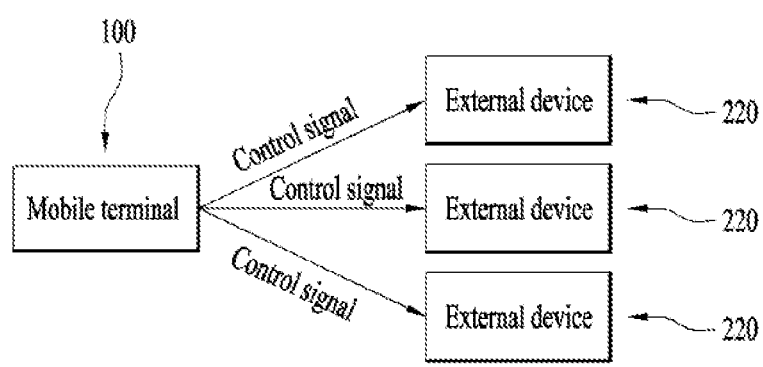
FIGS. 6 and 7 are schematic views illustrating connection between a mobile terminal according to the present disclosure and an external device.
Figure 7:
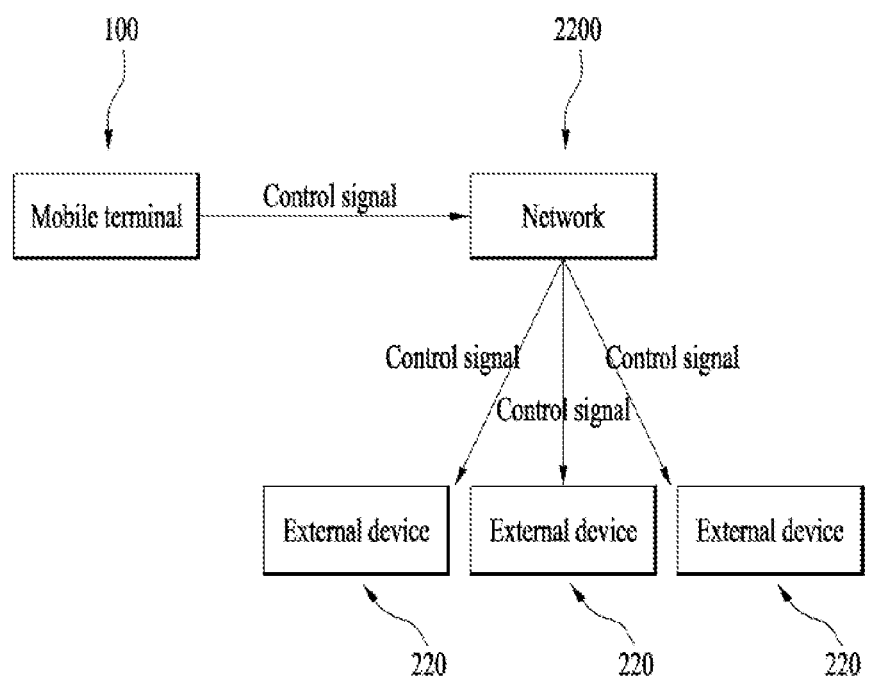

FIGS. 6 and 7 are schematic views illustrating connection between a mobile terminal 100 according to the present disclosure and an external device.

A control signal means a signal for allowing the external device 220 to perform a specific function of the control menu 230. The control signal of the mobile terminal 100 is transferred to the external device 220 to drive or control the external device 220.

In detail, a wireless communication module transmits the control signal generated by the controller to the external device 220 or a network 2200 to which the external device 220 is connected. The mobile terminal 100 and the external device 220 may directly be connected with each other by Wi-Fi direct, Bluetooth, IR mode, etc., or may directly be connected with each other through a network connected through a router, etc.

Transfer of the control signal is based on that communication between the mobile terminal 100 and the external device 220 is connected. In this case, communication connection may mean pairing between both devices.

If the external device 220 is recognized by being located in a preview image, the mobile terminal 100 and the external device 220 may perform pairing as a previous step for the signal transfer. In other words, if it is recognized that the external device 220 is located in the preview image in a state that the mobile terminal 100 and the external device 220 are not paired, the controller controls the wireless communication module of the mobile terminal 100 to be paired with the external device 220.

The control menu 230 may output to a position corresponding to a position where the external device 220 is provided as shown in FIG. 2, whereby it may intuitively be noted that the control menu 230 is a control menu for the corresponding external device.

FIG. 8 illustrates another embodiment of a mobile terminal 100 according to the present disclosure.

Unlike the aforementioned embodiments, the control menu 230 corresponding to the external device 220 may be located by being aligned at one side of the preview image 210. FIG. 8(*a*) illustrates that an indicator 2301 corresponding to the external device 220 is output as a control menu 230. The indicator 2301 may display that the corresponding external device 220 is connected with the mobile terminal 100 or display a state that the corresponding external device 220 may be connected with the mobile terminal 100, as described above. Moreover, the indicator 2301 may serve as an entrance menu 231 or an on/off menu 232 (not shown).

If a user input signal for the indicator 2301 occurs, a control signal may be generated to perform a corresponding function.

If the indicator 2301 serves as the entrance menu 231 as shown in FIG. 8(a), the on/off menu 232 or detailed operation menu 233 of the corresponding external device 220 may be output in accordance with the user input for the indicator 2301 as shown in FIG. 8(b).

For example, if the external device is TV and enters the on/off menu 232 and the detailed operation menu 233 in accordance with an indicator corresponding to the TV, the detailed operation menu 233 may perform a function such as volume control or channel change. Moreover, channel information which is currently in service may be displayed as detailed information 234. The controller may acquire channel information through image analysis of an output screen of the TV, which is output to the preview image, or may separately receive and acquire channel information through the wireless communication module.

In this embodiment, if a plurality of external devices 220 are provided, indicators 2301 corresponding to the plurality of external devices 220 may be listed at one side of the preview image 210, whereby an aligned user environment may be provided.

Particularly, the plurality of indicators 2301 corresponding to the external devices 220 may be output by being aligned in the order near the mobile terminal 100. This is advantageous in view of user friendly aspect in that the user is likely to manipulate the external device 220 near the mobile terminal 100.

FIG. 9 illustrates one embodiment of a mobile terminal 100 according to the present disclosure.

As one type of an AI camera, if a content from which an external device 220 such as TV 220c is output is included in the preview image 210 of the mobile terminal 100, it is advantageous that a user may check additional information through the mobile terminal 100 without checking additional information output to the external device 220 such as TV. Moreover, the user may immediately control the TV 220c.

FIG. 10 illustrates one embodiment of a mobile terminal 100 according to the present disclosure.

If the external device 220 recognized in the preview image 210 of the mobile terminal 100 is an external device 220d, which requires login or authentication, such as smartphone, tablet or PC, ID information of the mobile terminal 100 may be transferred to the corresponding external device 220d and then used.

For example, if the corresponding external device 220d outputs a login screen 2201 of a web site and the mobile terminal 100 has already completed login of the corresponding web site or has ID information, the mobile terminal 100 transfers the corresponding ID information to the external device 220d to allow the external device 220d to perform login without input of separate information.

A user input of a user input signal for ID information transfer may be a double-tap input. That is, if the external device, especially a login screen 2201 of the external device 220d is located in the preview image 210 while a camera application is being executed, the user may double-tap a random area or designated specific area of the preview image 210 to allow the ID information to be transferred to the external device 220d.

Figure 11:
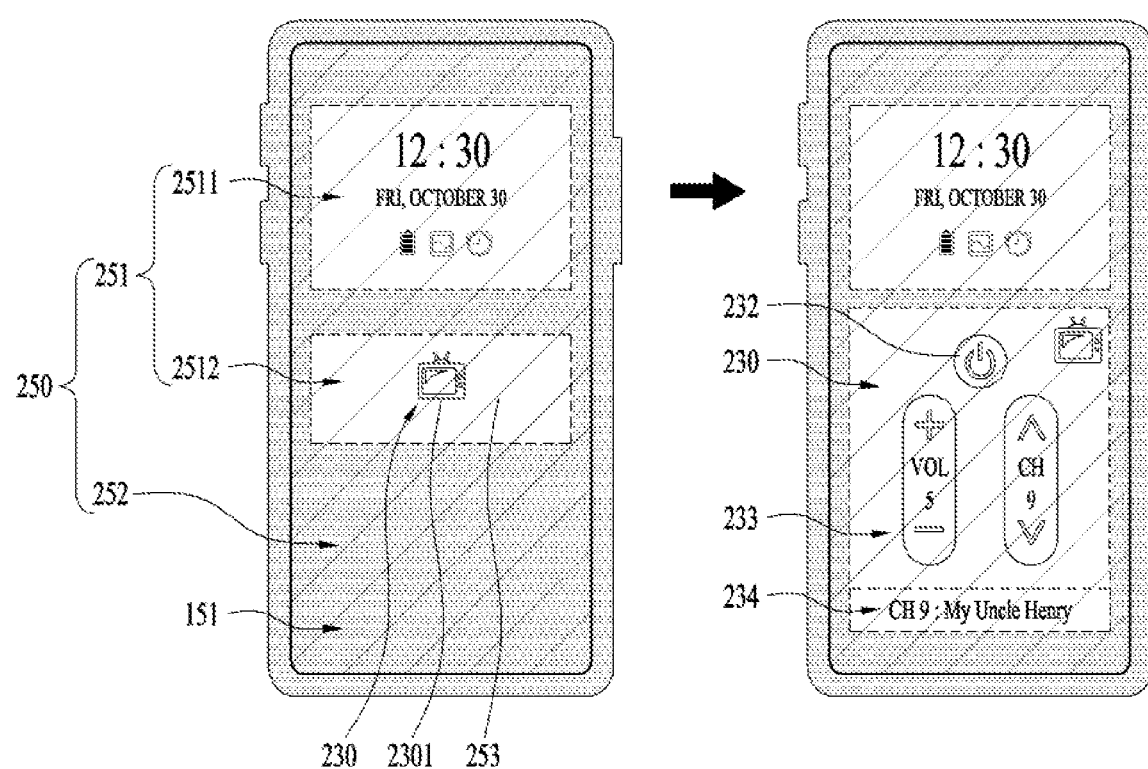
FIG. 11 illustrates one embodiment of a mobile terminal according to the present disclosure.

FIG. 11 illustrates one embodiment of a mobile terminal 100 according to the present disclosure.

The mobile terminal 100 may be connected with the external device 220 or control the external device 220 in a state of an always-on display 250.

If the mobile terminal 100 is connected with the external device or controls the external device in the state of the always-on display 250, it is advantageous that the mobile terminal 100 may immediately control the external device without executing a separate application.

The always-on display 250 outputs only specific information in a sleep state of the mobile terminal, whereby power consumption may be reduced and required information may be provided. Generally, the always-on display 250 has a non-output area 252 of a black background and an information output area 251.

The information output area 251 includes a first information output area 2511 outputting information related with the mobile terminal, and a second information output area 2512 outputting information related with the connected external device.

A content the same or similar to a status bar output from a home screen of the mobile terminal 100 may be output to the first information output area 2511. For example, the content may include current time, information as to whether a message has been received, a remaining battery capacity, etc.

An external device that may be connected with or controlled by the second information output area 2512 may be displayed on the second information output area 2512. In detail, a control menu 230 for the corresponding external device or an indicator 2301 may be displayed. The control menu 230 or the indicator 2301 may be defined in the same manner as the aforementioned embodiments and therefore its description will be omitted.

Unlike the case that the first information output area 2511 is only output in the related art, information on the external device 220 may be obtained or controlled through the second output area 2512.

The external device corresponding to the indicator 2301 may be located within a camera viewing angle, or may be within a specific distance from the mobile terminal 100. Alternatively, the external device may be external devices 220 dependent on a specific network 2200 (see FIG. 7) that may be accessed by the mobile terminal 100. That is, the external device has been already paired with the mobile terminal by the above condition, etc., or may be based on a condition capable of pairing with the external device. The user may recognize that the corresponding external device may be connected with or controlled by the mobile terminal through the indicator 2301.

At this time, if the external device is recognized through the camera, the camera application is executed on the background.

Unlike entrance to the home screen when the non-output area 252 or the first information output area 2511 is knocked-on, a user input for the second information output area 2512 or the control menu 230 of the second information output area 2512 generates a control signal for the corresponding external device.

Since an input effect is varied depending on area, an input boundary display line 253 of a corresponding area may be output together with the second information output area 2512 to avoid the user's error input, whereby only a user input in the input boundary display line 253 may be generated as the control signal for the external device. Alternatively, the control signal for the corresponding external device may be generated only if the user input occurs in the control menu 230 or the indicator 2301.

If a preset user input is sensed in the second information output area 2512, a control menu 230 capable of controlling the corresponding external device in detail may be output.

For example, if the connected external device is TV and a preset user input occurs in the indicator 2301 corresponding to the TV, the controller may allow the display unit 151 to output the control menu 230 such as on/off of the TV, channel change, volume change and current channel information.

The user input for the second information output area 2512 for occurrence of the control signal may be a double-tap input, that is, knock-on input.

This is because that an error input caused by a control signal generated by a single touch is properly avoided because the always-on display 250 performs only output of information before entering the home screen.

Therefore, when a knock-on is input for the non-output area 252 or the first information output area 2511, the mobile terminal 100 enters the home screen. When a knock-on is input for the second information output area 2512, the controller is connected with the external device or generates a control signal for controlling the external device. Alternatively, the controller may enter the control menu 230 for controlling the external device.

It will be apparent to those skilled in the art that the present specification can be embodied in other specific forms without departing from the spirit and essential characteristics of the specification.

Thus, the above embodiments are to be considered in all respects as illustrative and not restrictive. The scope of the specification should be determined by reasonable interpretation of the appended claims and all change which comes within the equivalent scope of the specification are included in the scope of the specification.

What is claimed is:

1. A mobile terminal comprising:
 a display configured to display an always-on screen; and
 a controller configured to:
  control the display;
  cause the display to display the always-on screen when the mobile terminal is in a sleep state, wherein the always-on screen includes a non-display area, a first information display area displaying information on the mobile terminal, and a second information display area displaying information on at least one external device connected with the mobile terminal or capable of being connected with the mobile terminal;
  cause the display to display a control menu for the at least one external device; and
  generate a control signal for controlling the at least one external device in response to a preset user input signal for the second information display area.

2. The mobile terminal of claim 1, wherein the control signal includes a driving signal for the at least one external device.

3. The mobile terminal of claim 1, further comprising a wireless communication module, wherein the controller is further configured to cause the wireless communication module to transmit the generated control signal to the at least one external device or a network to which the at least one external device is connected.

4. The mobile terminal of claim 1, further comprising a wireless communication module pairing with the at least one external device, wherein the controller is further configured to control the wireless communication module to perform pairing with the at least one external device when the mobile terminal and the at least one external device are not paired with each other.

5. The mobile terminal of claim 1, wherein the display includes a touch screen, and wherein when a user input of the user input signal corresponds to a double-tap touch input for the control menu, the control signal corresponds to an on/off function for operation of the at least one external device.

6. The mobile terminal of claim 1, wherein the controller is further configured to cause the display to display a plurality of indicators on the second information display area, each indicator corresponding to one of the at least one external device.

7. The mobile terminal of claim 6, wherein each of the plurality of indicators is aligned in an order of proximity of a corresponding one of the plurality of external devices from the mobile terminal.

8. The mobile terminal of claim 1, wherein the display includes a touch screen, and wherein the controller is further configured to:
 switch the always-on screen to a home screen of the mobile terminal in response to a knock-on touch input for the non-display area or the first information display area; and
 generate the control signal for controlling the at least one external device in response to a knock-on touch input for the second information display area.

9. The mobile terminal of claim 1, wherein the at least one external device includes at least one external device which is within a preset range from the mobile terminal.

10. The mobile terminal of claim 1, wherein the at least one external device includes an external device existing within a camera viewing angle of a camera of the mobile terminal.

11. The mobile terminal of claim 1, wherein the at least one external device includes at least one external device registered in a specific network.

12. A method for controlling a mobile terminal, the method comprising:
 displaying, on a display, an always-on screen when the mobile terminal is in a sleep state, wherein the always-on screen includes a non-display area, a first information display area displaying information on the mobile terminal, and a second information display area displaying information on at least one external device connected with the mobile terminal or capable of being connected with the mobile terminal;
 displaying, on the display, a control menu for the at least one external device; and
 generating a control signal for controlling the at least one external device in response to a preset user input signal for the second information display area.

13. The method of claim 12, further comprising performing, via a wireless communication unit, pairing with the at least one external device when the mobile terminal and the at least one external device are not paired with each other.

14. The method of claim 12, wherein the display includes a touch screen, and wherein when a user input of the user input signal corresponds to a double-tap touch input for the control menu, the control signal corresponds to an on/off function for operation of the at least one external device.

15. The method of claim 12, wherein the display includes a touch screen, and the method further comprising:

switching the always-on screen to a home screen of the mobile terminal in response to a knock-on touch input for the non-display area or the first information display area; and generating the control signal for controlling the at least one external device in response to a knock-on touch input for the second information display area.

16. The mobile terminal of claim 12, wherein the at least one external device includes at least one of at least one external device which is within a preset range from the mobile terminal, an external device existing within a camera viewing angle of a camera of the mobile terminal, or at least one external device registered in a specific network.

* * * * *